United States Patent [19]

Takeuchi

[11] Patent Number: 5,367,749

[45] Date of Patent: Nov. 29, 1994

[54] CABLE TIE

[75] Inventor: Yasuichi Takeuchi, Tokyo, Japan

[73] Assignee: Takeuchi Industrial Co., Ltd., Japan

[21] Appl. No.: 118,136

[22] Filed: Sep. 8, 1993

[30] Foreign Application Priority Data

Sep. 18, 1992 [JP] Japan .................. 4-71035

[51] Int. Cl.$^5$ .............................. B65D 63/00
[52] U.S. Cl. .................. 24/16 PB; 24/17 AP
[58] Field of Search ............... 24/16 PB, 16 R, 17 B, 24/17 AP, 30.5 P; 248/74.3

[56] References Cited

U.S. PATENT DOCUMENTS

| | | | |
|---|---|---|---|
| 4,580,319 | 4/1986 | Paradis ..................... | 24/16 PB |
| 4,766,651 | 8/1988 | Kobayashi et al. ......... | 248/74.3 |
| 4,944,475 | 7/1990 | Ono et al. .................. | 24/16 PB |
| 4,958,414 | 9/1990 | Benoit ....................... | 24/16 PB |
| 5,131,613 | 7/1992 | Kamiya et al. ............. | 24/16 PB |

FOREIGN PATENT DOCUMENTS 2145150  3/1985  United Kingdom ............ 24/16 PB

Primary Examiner—Victor N. Sakran
Attorney, Agent, or Firm—Laff, Whitesel, Conte & Saret

[57] ABSTRACT

This cable tie is constituted by a band portion (1) and a lock portion (2). The lock portion (2) has an elastically deformable sawtooth lock piece (24) and stopper means (23, 26). The sawtooth lock piece (24) opposes a slot in which the band portion (1) is inserted from a distal end side thereof and engages with a sawtooth belt portion of the band portion (1), thereby locking the band portion (1). The stopper means (23, 26) suppress deformable movement of the sawtooth lock piece (24) when a force in a pull-out direction is applied to the band portion (1). When a force is applied to the sawtooth lock piece (24) through the band portion (1), excessive deformation of the sawtooth lock piece (24) is suppressed by the stopper means (23, 26), thereby preventing the sawtooth lock piece (24) from being disengaged or damaged.

6 Claims, 4 Drawing Sheets

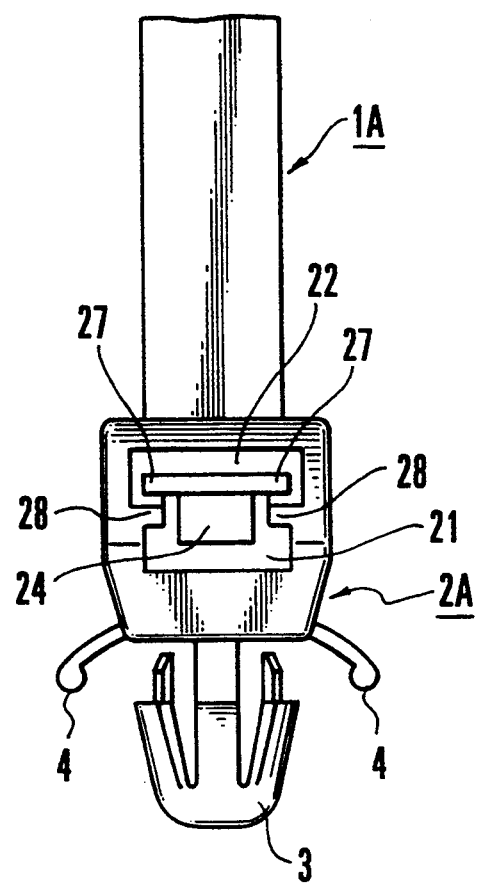
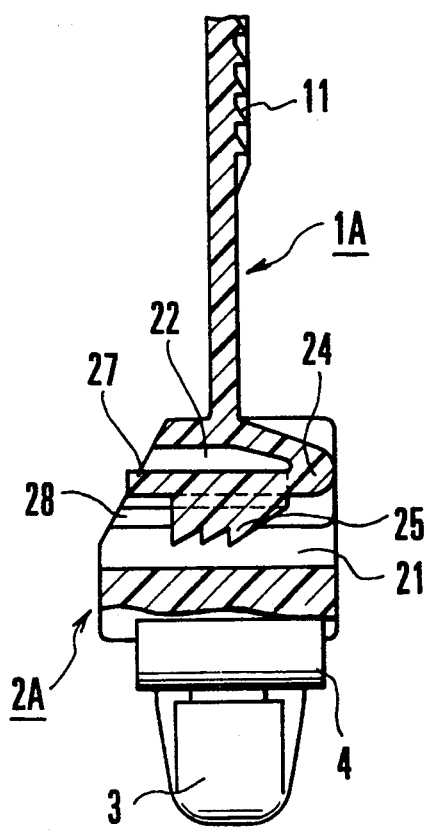
FIG.6A    FIG.6B
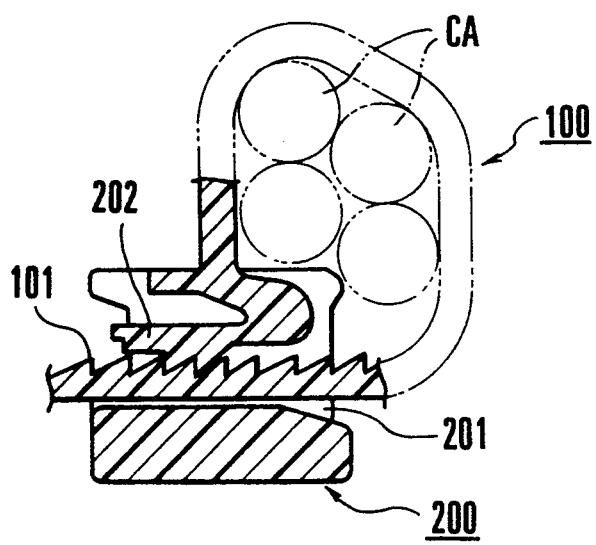
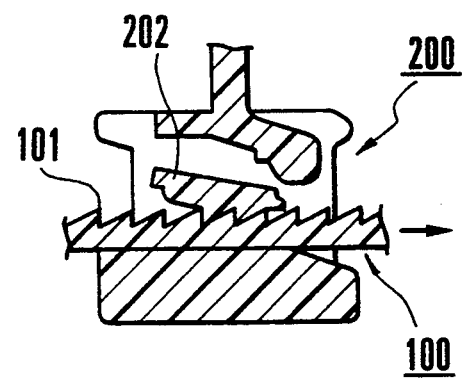
FIG.7A
PRIOR ART
FIG.7B
PRIOR ART

CABLE TIE

BACKGROUND OF THE INVENTION

The present invention relates to a cable tie for tying cables.

As a tool for tying a plurality of cables, a resin cable tie is conventionally used. As shown in an example of FIGS. 7A and 7B, this cable tie is constituted by a band portion 100 and a lock portion 200 that are integrally formed of a soft resin. The lock portion 200 is formed at the proximal end portion of the band portion 100 to be integral with it and allows the band portion 100 to be inserted through it, thereby locking the band portion 100. In this cable tie, when a plurality of cables CA to be tied are bound by the band portion 100 and the band portion 100 is inserted in a slot 201 of the lock portion 200 from its distal end side, a sawtooth belt portion 101 formed by arranging a plurality of sawteeth on one surface of the band portion 100 is engaged with a sawtooth lock piece 202 provided to oppose the slot 201 of the lock portion 200. The band portion 100 is locked at this position so that it will not be pulled out, thereby tying the cables CA.

In this conventional cable tie, the band portion 100 is locked by engaging its sawtooth belt portion 101 with the sawtooth lock piece 202. In order to allow insertion of the band portion 100, the sawtooth lock piece 202 is elastically deformable in the lock portion 200. Hence, when the cables are tied, if a large pull-out force is applied to the band portion 100 as indicated by an arrow in FIG. 7B, this force is transmitted from the sawtooth belt portion 101 to the sawtooth lock piece 202. Then, the sawtooth lock piece 202 is deformed and sometimes disengaged from the sawtooth belt portion 101. In an extreme case, the sawtooth lock piece 202 may be sheared from its proximal end portion by a force larger than a predetermined value, as shown in FIG. 7B. When the sawtooth lock piece 202 is disengaged or damaged by shearing, in this manner, the band portion 100 cannot be locked, and the original function of the cable tie of tying cables is impaired.

SUMMARY OF THE INVENTION

It is an object of the present invention to provide a cable tie having an improved reliability in cable tying by increasing the locking force of the band portion at the lock portion.

In order to achieve this object, according to an aspect of the present invention, there is provided a cable tie constituted by a band portion and a lock portion, wherein the lock portion comprises an elastically deformable sawtooth lock piece, opposing a slot in which the band portion is inserted from a distal end side thereof, and engaged with a sawtooth belt portion of the band portion, thereby locking the band portion, and stopper means for suppressing excessive deformation of the sawtooth lock piece when a force in a pull-out direction is applied to the band portion.

BRIEF DESCRIPTION OF THE DRAWINGS

FIGS. 6A and 6B are a front view and a partially sectional right side view, respectively, of a lock portion shown in FIG. 5; and FIGS. 7A and 7B are sectional views for explaining a conventional cable tie and its inconvenience.

DESCRIPTION OF THE PREFERRED EMBODIMENTS

The preferred embodiments of the present invention will be described with reference to the accompanying drawings.

Figure 1:
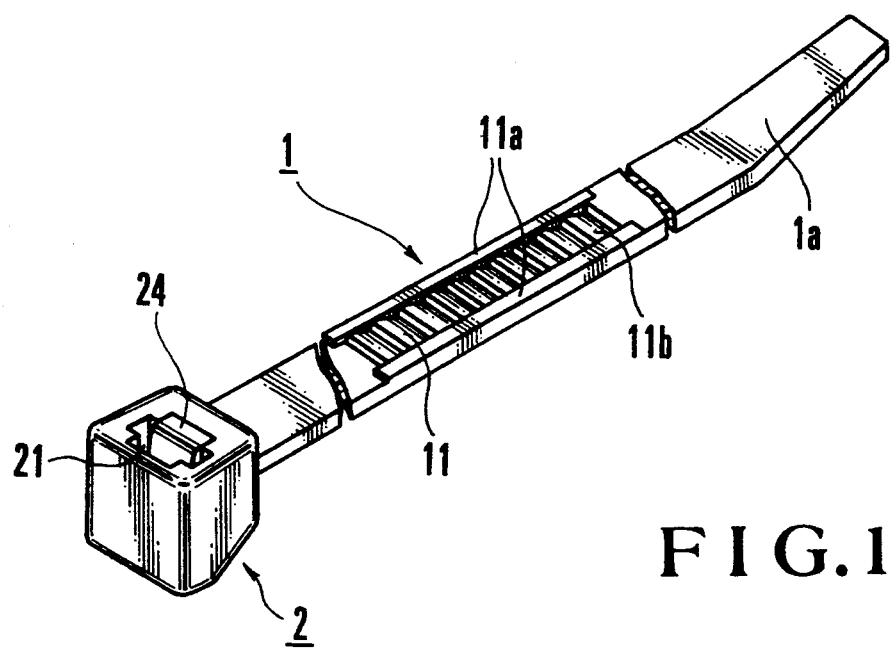
FIG. 1 is a perspective view showing the overall structure of the first embodiment of the present invention.
Figure 2:
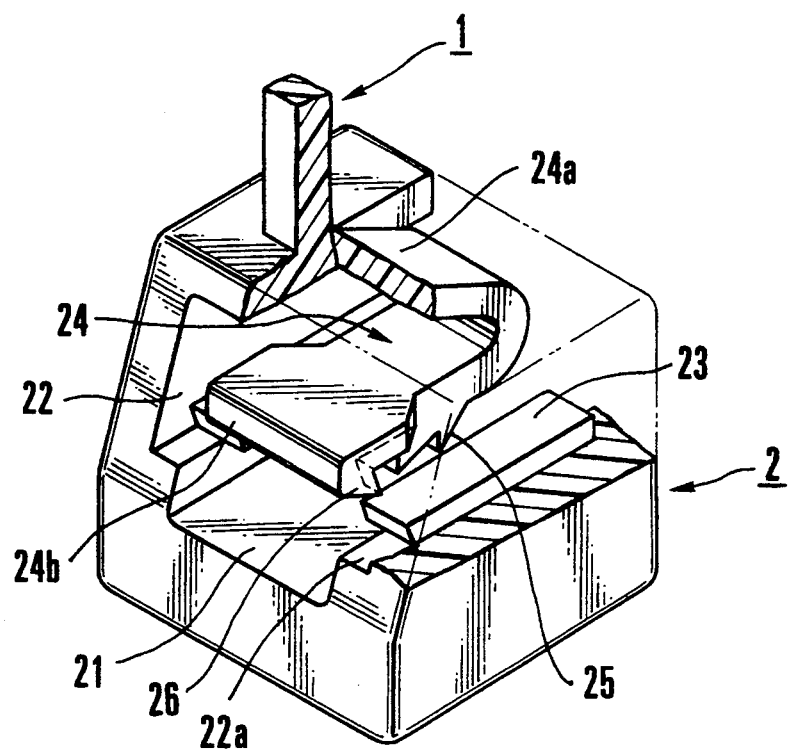
FIG. 2 is a partially cutaway enlarged perspective view showing a lock portion shown in FIG. 1.
Figure 3A:
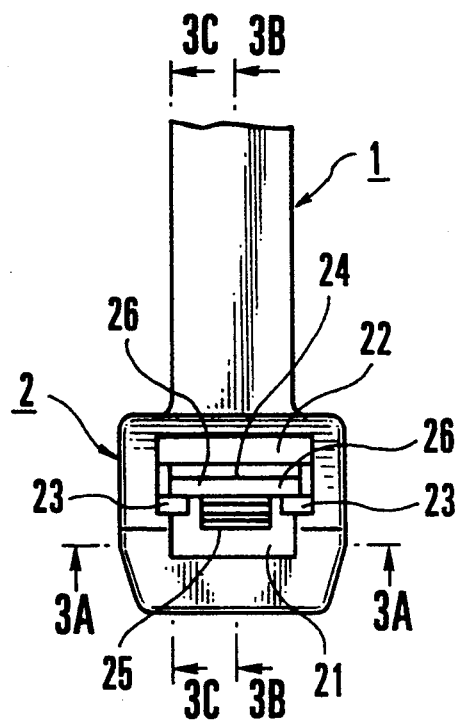
FIG. 3A is a front view of the lock portion shown in FIG. 1.
Figure 3B:
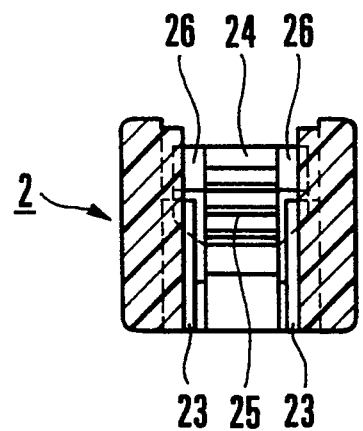
FIG. 3B is a sectional view of the lock portion taken along the line 3A—3A of FIG. 3A.
Figure 3C:
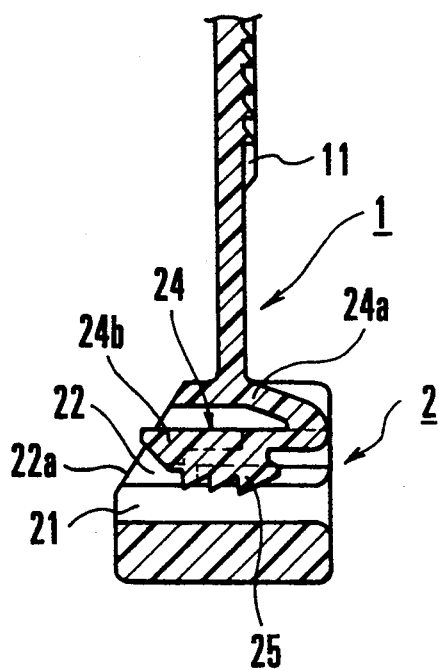
FIG. 3C is a sectional view of the lock portion taken along the line 3B—3B of FIG. 3A.
Figure 3D:
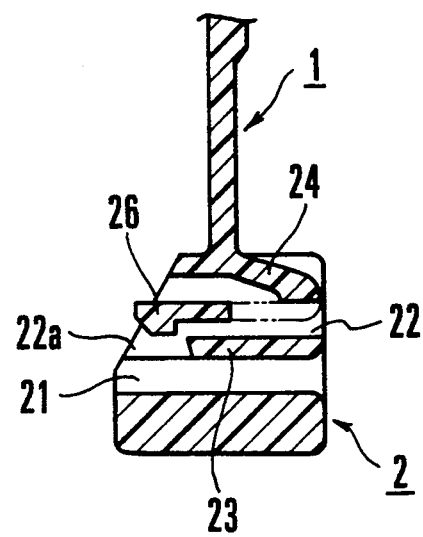
FIG. 3D is a sectional view of the lock portion taken along the line 3C—3C of FIG. 3A.

FIG. 1 shows a cable tie according to the first embodiment of the present invention. A cable tie CT is constituted by an elongated belt-like band portion 1 and a lock portion 2 integrally formed at the proximal end of the band portion 1. The band portion 1 and the lock portion 2 are integrally formed of a comparatively soft or flexible resin material. The band portion 1 extends to have a predetermined width from its portion connected to the lock portion 2. The width of a distal end portion 1a of the band portion 1 is narrowed in the tapered manner. This tapered shape of the distal end portion 1a aims at facilitating insertion thereof into a slot 21 formed in the lock portion 2, as will be described later. A sawtooth belt portion 11 is integrally formed on one surface of the band portion 1. A plurality of sawtooth portions 11b are continuously formed at the central portion of the sawtooth belt portion 11 for a required length excluding its two side edge portions 11a.

As shown in FIGS. 2, 3A, 3B, 3C, and 3D, the lock portion 2 is thicker than the band portion 1, and the slot 21 capable of receiving the band portion 1 in one direction from the distal end side is formed to extend through the substantially central portion of the lock portion 2. The slot 21 has an opening slightly larger than the size of the cross-section of the band portion 1.

A lock piece chamber 22 slightly wider than the slot 21 is formed adjacent to the slot 21, thereby defining one internal space in the lock portion 2. Furthermore, a pair of stopper portions 23 are formed integrally with the lock portion 2 on boundary portions 22a on the two sides of the internal space defined by the slot 21 and the lock piece chamber 22 in the widthwise direction, and extend in the lengthwise direction of the slot 21 in a rail-like manner. A sawtooth lock piece 24 is housed in the lock piece chamber 22. One end portion 24a of the sawtooth lock piece 24 is coupled to an inner surface of the lock piece chamber 22 to which the band portion 1 is mounted. The other end portion 24b of the sawtooth lock piece 24 has a lower surface substantially parallel with the longitudinal direction of the slot 21, and a plurality of sawteeth 25 are integrally formed on this lower surface. Hook portions 26 having distal end sides bent toward the slot 21 are integrally formed on the two side portions of the other end portion 24b of the sawtooth lock piece 24, and oppose one end portion of the stopper portions 23 in the direction of elasticity of the sawtooth lock piece 24. The gaps between the hook portions 26 and the stopper portions 23 are set as small as possible so as not to impair the engaging operation of the sawtooth lock piece 24 with the band portion 1 caused by the elastic deformation of the sawtooth lock piece 24. The proximal end sides of the hook portions 26 are formed in the tapered shape.

Figure 4A:
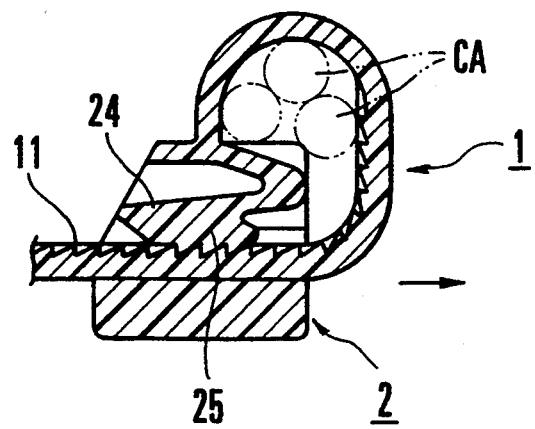
FIGS. 4A and 4B are sectional views for explaining the tying state of cables and a corresponding operation.

With this structure, as shown in FIG. 4A, the band portion 1 is wound on the cables CA to be tied to bind them, and the distal end portion of the band portion 1 is inserted in the slot 21 from one side of the slot 21. When the distal end of the band portion 1 is pulled from the other side of the slot 21, the ring diameter of the band portion 1 is decreased to tie the cables CA. At this time, when the band portion 1 is pulled, the entire portion of the sawtooth lock piece 24 of the lock portion 2 is pivoted or elastically deformed in a direction opposite to that of an arrow of FIG. 4A. Thus, the sawtooth belt portion 11 of the band portion 1 is moved in a direction opposite to that of the arrow of FIG. 4A to move over the sawteeth 25 of the sawtooth lock piece 24.

When the pulling operation of the band portion 1 is stopped, the sawtooth lock piece 24 is elastically restored to the original state. At this time, the sawtooth belt portion 11 firmly meshes with the sawteeth 25 of the sawtooth lock piece 24. In this state, the band portion 1 is locked with the lock portion 2 at the sawtooth belt portion 11, so that the tied state of the cables CA is held.

Figure 4B:
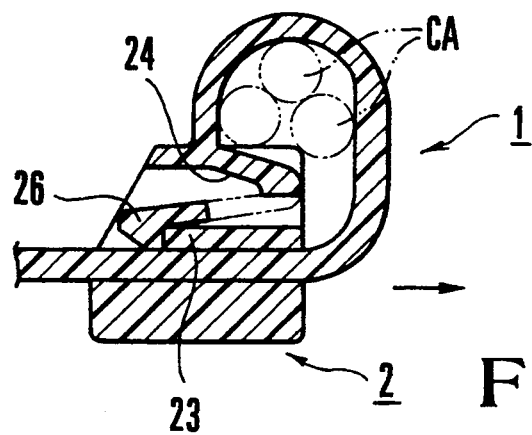

In this state, when a force in the pull-out direction (a direction of the arrow of FIG. 4A) is applied to the band portion 1, the force in the band portion 1 is transmitted to the sawtooth lock piece 24 due to the meshing between the sawtooth belt portion 11 and the sawtooth lock piece 24, so that the force in the direction of the arrow in FIG. 4A is applied to the sawtooth lock piece 24. The sawtooth lock piece 24 is deformed in the direction of the arrow, and a large shearing force is applied to its proximal end portion. However, as shown in FIG. 4B, as the sawtooth lock piece 24 is deformed, the hook portions 26 integrally formed at the two sides thereof are moved downward to be engaged with the stopper portions 23, so that the force applied to the sawtooth lock piece 24 in the direction of the arrow is received by the engagement of the hook portions 26 with the stopper portions 23. Therefore, the sawtooth lock piece 24 is prevented from being further deformed, and the disengagement of the sawtooth lock piece 24 from the sawtooth belt portion 11 can be prevented, or the sawtooth lock piece 24 will not be sheared to disable its engagement with the sawtooth belt portion 11. As a result, the cables are reliably and firmly tied.

Figure 5:
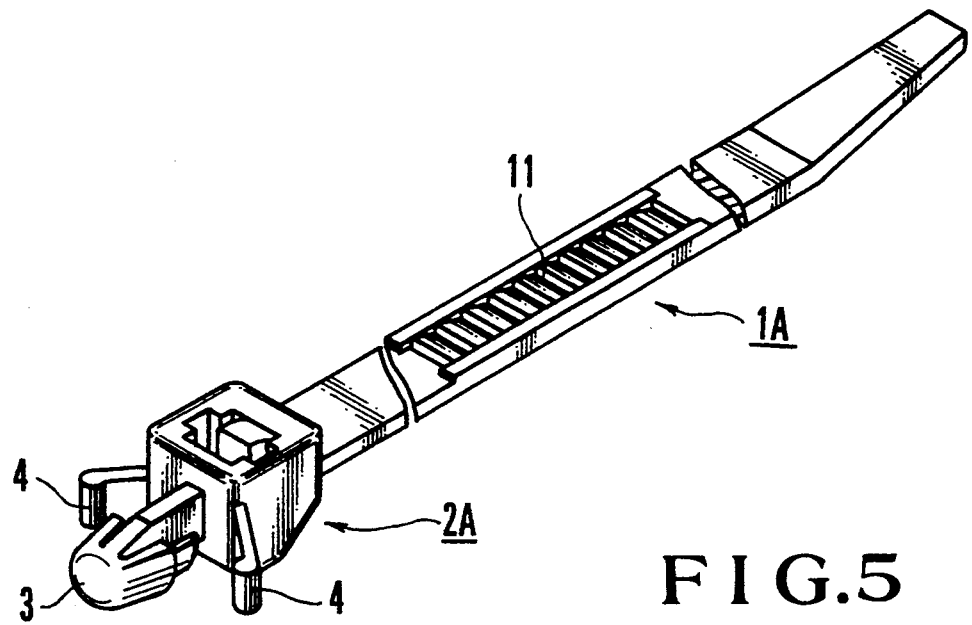
FIG. 5 is a perspective view showing the overall structure of the second embodiment of the present invention.

FIG. 5 shows an embodiment in which the present invention is applied to a cable tie called a snapping relief tie, i.e., a cable tie in which a lock portion is fitted in and supported by a hole formed in a chassis or board (to be referred to as a chassis or the like hereinafter). Referring to FIG. 5, reference symbol 1A denotes a band portion; and 2A, a lock portion. An anchor-shaped clip portion 3 is integrally formed on the bottom portion of the lock portion 2A, and a pair of elastic wing pieces 4 opposing the clip portion 3 are integrally formed on the two sides of the lock portion 2A.

FIGS. 6A and 6B show the lock portion 2A in more detail. In place of the hook portions formed on the two sides of a sawtooth lock piece 24, flange portions 27 are integrally formed on the two sides of sawtooth lock piece 24 to extend from the two sides of the sawtooth lock piece 24. Stopper portions 28 are formed on the two sides of the sawtooth lock piece 24 to extend for substantially the entire length of the boundary portion between a slot 21 and a lock piece chamber 22. The flange portions 27 and the stopper portions 28 are located to oppose each other in the direction of the elastic deformation of the sawtooth lock piece 24.

In the cable tie having this arrangement, the clip portion 3 is inserted in a hole formed in the chassis or the like before tying the cables. At this time, the chassis or the like is bound by the anchor-like shape of the clip portion 3 and the elastic wing pieces 4, thereby fixing a lock portion 2 to the chassis or the like. In this state, the band portion 1A is wound on the cables, and the distal end of the band portion 1A is inserted in the slot 21 of the lock portion 2A. Then, a sawtooth belt portion 11 is engaged with the sawtooth lock piece 24 to tie the cables in the same manner as in the first embodiment described above.

When a force in a pull-out direction is applied to the band portion 1A, this force is transmitted to the sawtooth lock piece 24 to slightly deform it. At this time, the flange portions 27 are moved simultaneously to collide against the stopper portions 28, so that further deformation of the sawtooth lock piece 24 is suppressed. Then, the sawtooth lock piece 24 is prevented from being disengaged from the sawtooth belt portion 11, or the sawtooth lock piece 24 is prevented from being sheared, so that engagement between the sawtooth lock piece 24 and the sawtooth belt portion 11 is maintained, thereby improving the reliability of cable tying in the same manner as in the first embodiment described above.

Although not shown in the drawings, the present invention can similarly be applied to a cable tie for tying a lock portion on a chassis or the like by screws.

As has been described above, according to the present invention, a stopper means for suppressing deformation or movement of a sawtooth lock piece is provided to a lock portion that locks a band portion. Even when a force in a pull-out direction is applied to the band portion, the sawtooth lock piece is prohibited from being deformed or moved by this force, and the sawtooth lock piece is prevented from being disengaged from a sawtooth belt portion or from being sheared, thereby obtaining a cable tie that can tie cables with a band portion at a high reliability.

What is claimed is:

1. A cable tie comprising:
an elongated belt-like band portion which has a sawtooth belt portion formed on one surface thereof and is wound on cables to be tied;
a lock portion, integrally formed on a proximal end of said band portion, for engaging with said sawtooth belt portion, thereby locking said band portion, wherein
said lock portion has an internal space formed therein, the internal space including a slot in which said band portion is inserted from a distal end side thereof,
the internal space being provided with:
an elastically deformable sawtooth lock piece, having a proximal end coupled to said lock portion, and a distal end portion having sawteeth for engaging with said sawtooth belt portion, thereby locking said band portion, stopper means for suppressing excessive deformation of said sawtooth lock piece when a force in a pull-out direction is applied to said band portion;

said stopper means comprising:

hook portions integrally formed with said sawtooth lock piece, and stopper portions integrally formed with said lock portion to oppose said hook portions, and when a force in a pull-out direction is applied to said band portion to deform said sawtooth lock piece, said hook portions engaging with said stopper portions.

2. A cable tie according to claim 1, wherein said hook portions are integrally formed on two side portions of said sawtooth lock piece, and said stopper portions are integrally formed on two side portions of the slot in the internal space.

3. A cable tie according to claim 3, wherein a wide lock piece chamber, enlarged in a direction of a width thereof, is formed in the internal space to be adjacent to the slot, said sawtooth lock piece is located to extend from the slot to said lock piece chamber, and said stopper portions are provided on boundary portions between the slot and said lock piece chamber.

4. A cable tie comprising:

an elongated belt-like band portion which has a sawtooth belt portion formed on one surface thereof and is wound on cables to be tied;

a lock portion, integrally formed on a proximal end of said band portion, for engaging with said sawtooth belt portion, thereby locking said band portion, wherein said lock portion has an internal space formed therein, the internal space including a slot in which said band portion is inserted from a distal end side thereof, the internal space being provided with:

an elastically deformable sawtooth lock piece, having a proximal end coupled to said lock portion, and a distal end portion having sawteeth for engaging with said sawtooth belt portion, thereby locking said band portion, stopper means for suppressing excessive deformation of said sawtooth lock piece when a force in a pull-out direction is applied to said band portion;

said stopper means comprising:

flange portions integrally formed with said sawtooth lock piece and projecting from two sides of said sawtooth lock piece, and stopper portions provided at internal positions of the internal space that oppose said flange portions, and when a force in a pull-out direction is applied to said band portion to deform said sawtooth lock piece, said flange portions are brought into colliding contact with said stopper portions.

5. A cable tie according to claim 4, wherein the internal space has a wide lock piece chamber enlarged in a direction of width thereof and adjacent to the slot, said flange portions are located in said lock piece chamber, and said stopper portions are provided at boundary portions between the slot and said lock piece chamber.

6. A cable tie according to any one of the claims 2-5, wherein said lock portion is provided with a clip portion.

* * * * *